Oct. 19, 1965   W. HAAS   3,212,528
HOSE
Original Filed April 11, 1957
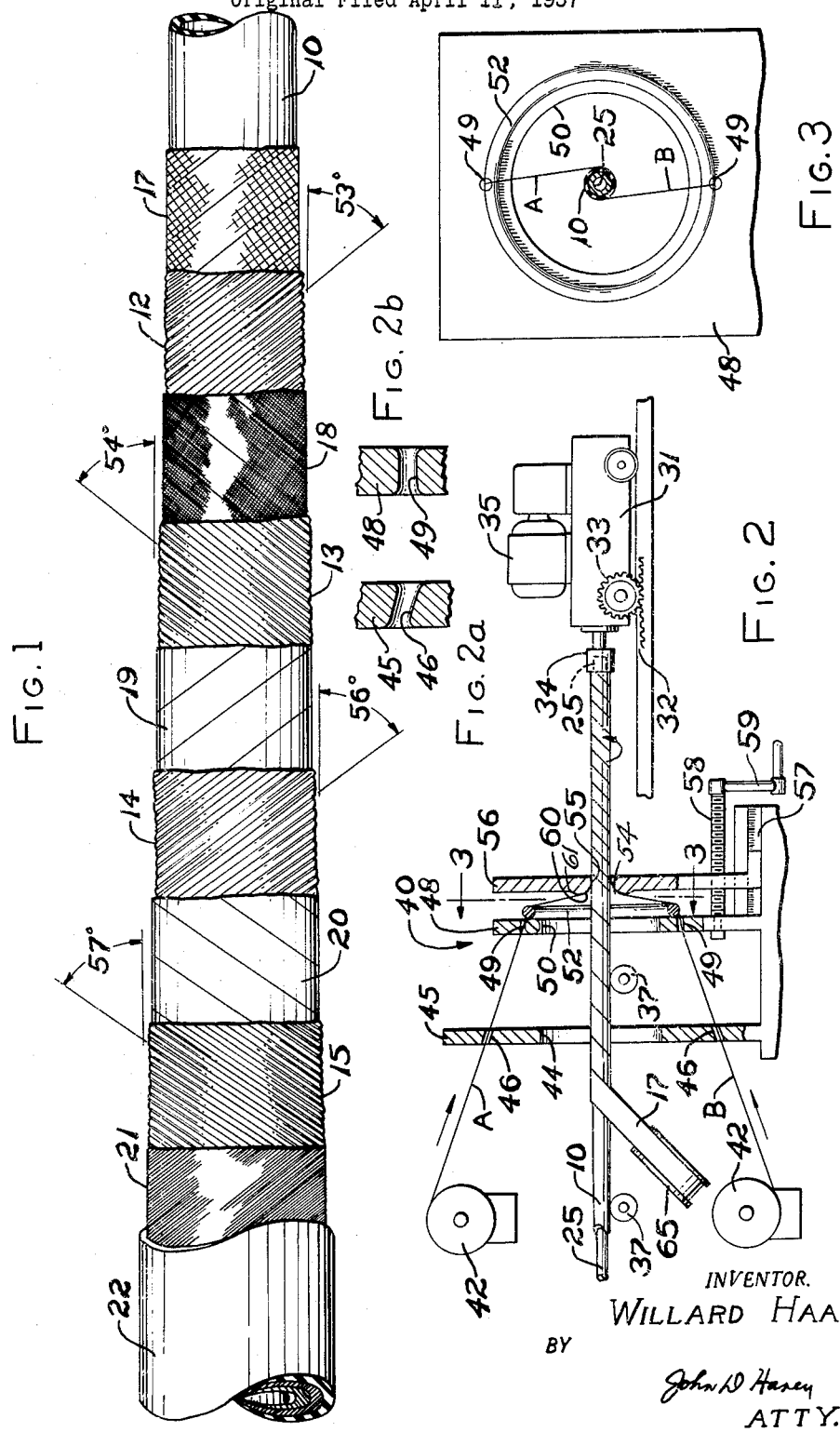
INVENTOR.
WILLARD HAAS
BY
John D Hasey
ATTY.

United States Patent Office 3,212,528
Patented Oct. 19, 1965

3,212,528
HOSE
Willard Haas, Cuyahoga Falls, Ohio, assignor to The B. F. Goodrich Company, New York, N.Y., a corporation of New York
Continuation of applications Ser. No. 652,232, Apr. 11, 1957, and Ser. No. 157,448, Dec. 6, 1961. This application Feb. 13, 1964, Ser. No. 344,759
3 Claims. (Cl. 138—130)

This invention relates to the manufacture of flexible wire-reinforced rubber hose especially suited for high-pressure hydraulic systems. The invention includes both a novel hose construction and a method for making such hose. This application is a continuation of my pending application Serial No. 652,232 filed April 11, 1957, now abandoned, and my pending application Serial No. 157,448, filed December 6, 1961, also now abandoned.

Hose customarily used for hydraulic systems has been reinforced with braided wires to impart the requisite burst resistance without unduly stiffening the hose. A significant disadvantage of a braided wire reinforcement in a hose subjected to high pressures (for example 3,000 pounds per square inch or more), however, is that braided wires are crimped or curved sharply on each other so that pressure surges of fluid within the hose cause the wires to rub and flex about each other at each plait. Repeated rubbing and flexure weakens the wires and materially limits the useful life of the hose.

The disadvantage of braids in this respect can be obviated by reinforcing a hose with wire plies in which the wires are disposed in parallel helical convolutions. Prior to this invention, however, high pressure hose made with helically wrapped wire plies has been commercially unacceptable because it could not be cut without having the wire ends at the severance plane flare wildly from their respective plies making it difficult or impossible to attach a fitting to the cut end.

Moreover, since wires having satisfactory tensile strength for this purpose is very fine, and highly resilient, it has been very difficult to wrap these wires on a hose carcass in uniform convolutions and at the same time avoid mutilating the underlying rubber carcass material.

In accordance with this invention commercially satisfactory hose is provided embodying reinforcing plies formed of a multiplicity of individual resilient wires disposed in helical convolutions. Objectionable flaring of the wire ends at a severance plane is wholly eliminated. In the hose provided by this invention two or more concentric helical wire plies of opposite hand are included in the wall of the hose. At least the outermost wire ply is in resilient gripping engagement with the underlying adjacent portions of the wall of the hose. Thus, wherever this hose is cut, the wire ends do not flare but, on the contrary, tend to constrict the hose end slightly. In making this hose the wires of at least the outer ply are formed to impart to them an inherent tendency to take the shape of a helix the diameter of which is preferably somewhat less than the diameter of the convolutions in which the wires are in fact wrapped on the hose carcass and the pitch of which is also preferably less than, but at least does not substantially exceed the pitch of the convolutions in which the wires are in fact wrapped on the hose carcass. The inner wire plies also may be formed to exert constricting pressure on their respective underlying portions of the hose carcass. Successive wire plies are insulated from each other by rubber or rubber-treated fabric, plastics or other flexible material. The term "rubber" as used herein includes natural rubber and the various synthetic materials having, or which may be compounded to impart, the characteristic flexibility and extensibility of rubber. The rubber materials used in hydraulic hose are normally oil-resistant rubbers known in the art as neoprene or nitrile rubber compounds.

Optionally, in some types of hose, the innermost wire ply may be formed so that it tends to expand radially, thereby exerting a radially outward compressive force on the surrounding portions of the hose carcass instead of constricting pressure as noted previously. Normally the innermost wire ply is positioned closely adjacent a central fluid-tight rubber or plastic tube extending through the hose. Accordingly, by forming the innermost ply so that it is somewhat expansible, the wire ends at a severance plane tend to expand slightly radially outwardly of the tube, thereby avoiding distortion of the tube and possible obstruction of the passage through the hose. Also, certain types of couplings are attached to the hose end by inserting the coupling shank concentrically between the first ply and the tube forming the center of the hose. Making the first ply slightly expansible facilitates this assembly.

In the preferred manufacturing procedure for the hose of this invention the multiplicity of individual wires which are integrated to form each ply are trained under equal uniform tension from a wire supply and are attached to the surface of the portion of the hose carcass on which the ply is to be formed. The portions of the wires near the hose carcass are gathered into an array converging concentrically toward the hose carcass and as the array approaches the location where it is progressively wrapped on the carcass the converging portions of the wires are shaped to a helical curvature to either grip the hose carcass or to expand from the hose carcass, as the case may be. The shaping is effected by bending the converging portions of the wires over suitably contoured surfaces under sufficient tension to cold work all the wires simultaneously and impart to each an inherent tendency to take the shape of a helix of the particular size desired.

Hose embodying this invention has been found to be particularly useful for hydraulic systems where fluid pressures are as high as 15,000 pounds per square inch or more. It undergoes practically no twisting or significant dimensional changes under pressure. Moreover, it has been found to possess exceptionally better impulse fatigue life (i.e., burst resistance under service conditions where it is subjected to frequent extreme pressure surges) than hose of corresponding size with braided wire reinforcements which has been previously used for this service.

An embodiment of the invention will be further described with reference to the accompanying drawings. In the drawings:

FIG. 1 shows a hose construction made in accordance with this invention, the component portions of the hose cover being broken away progressively to illustrate the nature of the several components;

FIG. 2 shows in schematic form equipment which may be advantageously used for manufacturing hose in accordance with the method of this invention;

FIGS. 2a and 2b are fragmentary detail views of certain parts of the equipment shown in FIG. 2; and FIG. 3 is a fragmentary view taken along the line 3—3 of FIG. 2.

Referring to FIG. 1, the hose structure includes a fluid-tight rubber tube 10 surrounded by a wall which includes four wire reinforcing plies identified by the reference numerals 12, 13, 14 and 15. The wire plies are concentrically arranged about the tube 10 and are separated by layers of rubber or rubber-treated non-metallic fabrics 17, 18, 19, 20 and 21. The exterior of the carcass is encased by a rubber cover 22.

Each of the wire plies is composed of a multiplicity of individual fine high-tensile wires disposed in parallel helical convolutions about the longitudinal axis of the hose. The helix is of opposite hand in successive plies. That is to say, the direction of the helix alternates in successive wire plies. The wires are preferably standard monofilamentary high-tensile strength cold-drawn spring steel wire. The so-called "music" quality wire having a tensile strength at the yield point of about 300,000 to 425,000 pounds per square inch and ranging from about .010 inch to about .030 inch in diameter may be used advantageously. With this hose construction the wires may be used in the form in which they are cold drawn at the wire mills, no cleaning or other treatment normally being required. The wires comprising each ply are preferably packed as close together as possible so that they are substantially in laterally abutting relation. For development of maximum strength in high-pressure hydraulic hose, at least 85% of the underlying surface should be covered by the wires of each ply. Preferably more than about 90% up to 100% of the underlying surface is covered by each ply to obtain maximum burst resistance. It may be convenient to use the same number of wires in each ply, and in that case it is evident that in the outermost plies the wires will be spaced apart slightly more than the wires of the innermost plies because the diameter of the outer plies is larger than the inner plies.

In the hose shown in FIG. 1, the innermost wire ply 12 is wrapped upon a layer of loosely woven fabric 17 which in turn encloses the rubber tube 10. Since the tube 10 is in an unvulcanized state when the wire plies are wrapped, the fabric layer 17 protects the tube from being cut or gouged when the first wire ply 12 is wrapped. The fabric 17 is a coarse cloth of about 15 warp threads per inch and 10 weft threads per inch and is applied over the tube after the tube is washed with a suitable solvent. It is convenient to slit the fabric 17 to a tape of suitable width which is wound helically with its edges abutting, at the same angle as the wires of the first ply 12. Some of the surface material of the tube usually oozes or "strikes" through the meshes of the fabric 17 when the first wire ply 12 is applied, to fill the spaces between the wires and provide an adhesive bond between the tube 10 and the first wire sheath 12 when the hose construction is eventually vulcanized.

The several wire plies are insulated one from another. Between the first wire ply 12 and the second wire ply 13, this insulation takes the form of a layer of rubberized cloth 1. This layer 18 is preferably square woven cloth of a relatively fine weave such as 48 warp and 48 weft threads per inch, which is impregnated with rubber on both sides by calendering. It is also conveniently slit to a narrow tape which is wrapped helically in abutting convolutions about the first wire ply 12 at the same angle as the second wire ply 13. The cloth 18 binds the wires of the first ply so that those wires can not become displaced from the position in which they are laid, which is most important for the innermost ply since it does not have as much internal support as the outer plies. In some cases rubber alone is adequate for this layer 18.

The third wire ply 14 is insulated from contact with the second wire ply 13 by a layer of rubber 19 and the fourth wire ply 15 is insulated from the third wire ply 14 by a layer of rubber 20. The insulating rubber 19 and 20 are conveniently applied in the form of a narrow tape which is wound upon their respective plies in abutting convolutions. The wires of each ply are wrapped upon their respective insulating layers with sufficient tension to cause some of the rubber material to be squeezed into the spaces between the wires of both the ply being applied over the insulating layer and the wire ply underlying the insulating layer. Thus the rubber insulating layers (and the rubber calendered on the cloth 18) provide a matrix in which the wires of the plies which they separate are embedded. The thickness of the insulating layers may vary considerably. It is usually desirable to keep these layers rather thin to avoid unduly stiffening the hose, and building up unnecessary thickness.

The outer or fourth wire ply 15 may itself serve as the outer covering of the hose, or various conventional types of coverings may be used. In the hose of FIG. 1 a serving of textile cords 21 such as cotton or nylon is wound helically about the outer wire ply 15. Preferably these cords are impregnated with a rubber material and may be adhered adequately to the ply 15 by the rubber material of the insulating layer 20 which is squeezed outwardly between the wires of ply 15. The outer rubber cover 22 surrounding the serving 21 may be extruded over the reinforcing plies or it may be wound on the carcass portion in the form of a tape in the manner conventional in the art. The complete hose carcass may be cured in open steam vulcanizers in the conventional manner, either exposed or encased in lead or a textile wrapper common to the hose manufacturing art.

In order to avoid objectionable flaring or displacement of the wires at a severance plane, the outer wire ply 15 is applied so that it inherently tends to exert a gripping or constricting resilient pressure on the underlying portions of the hose carcass. This result is obtained by forming or imparting to each wire of the outer ply an inherent tendency to take the shape of a helix of a size such that the diameter of the neutral lay of each helically shaped wire in this ply would be less than the diameter of the convolutions in which the wire is in fact wrapped on the hose carcass, and likewise such that the pitch of the neutral lay of each helically shaped wire would be slightly less than the pitch of the wrapped convolutions. The term "neutral lay" as used herein means the helical shape an individual helically-formed wire would take if free from any external deforming forces. The term "diameter" with reference to the neutral lay means the outer diameter of the wire helix under strain-free conditions from one side of the helix to a plane surface on which the opposing portions of the convolutions rest. Accordingly the wire ends of the outer ply at a severance plane will remain passive, even when a portion of the outer cover is stripped back from the cut ends to attach a coupling or other suitable fitting.

In general, a wire can be formed helically to grip or constrict the underlying carcass if the spiral length of wire contained in one complete convolution of its neutral lay is less than the spiral length of wire contained in one complete convolution when wrapped on the hose carcass. However, in the outer ply 15, from which the cover may be stripped near a cut end, it is preferable to shape the wires so that the diameter of their neutral lay is less than, or at least does not substantially exceed, the diameter of the convolutions in which the wires are wrapped. Similarly the pitch of the neutral lay should be greater than about 50% of the pitch of the wrapped convolutions but not substantially greater than the pitch of the wrapped convolutions to avoid the possibility of having the wire ends thrust outwardly in an axial direction of the hose when the cover is stripped from the outer ply.

In this invention at least the outermost wire ply exerts a gripping or constricting pressure on the underlying portions of the hose. When more than two plies are present it is desirable that two or more of them exert a constricting pressure. In some instances all the plies may be so constructed that all of them will tend to constrict the underlying layers, either equally or to a lesser extent in the first or innermost ply or plies. On the other hand, as has already been pointed out, it is advantageous under certain conditions to form the innermost or first ply 12 so that it tends to expand slightly relative to the underlying portions of the hose carcass.

The forming of ply 12 so that it tends to expand slightly is accomplished by shaping the wires so that the spiral length of one complete neutral convolution is slightly longer than the spiral length of one complete wrapped convolution. To avoid the possibility of having the wire ends thrust outwardly axially when the hose is cut, it is preferable that the pitch of the convolutions in the neutral lay is less than or at least does not substantially exceed the pitch at which the convolutions are wrapped.

As an example of a specific construction, a hose having four wire plies as described in the foregoing is made with a neoprene tube 10 of ½ inch internal diameter and an outer diameter of 21/32 inch. The fabric 17, which is placed between the tube 10 and the first wire ply 12, is a square woven cotton fabric containing 15 warp ends per inch and 10 weft ends per inch and is slit to form a tape 1¾ inches wide. The cloth 18, which is placed between the first and second wire plies 12 and 13, is square woven cotton fabric having 48 warp ends and 48 weft ends per inch. It is frictioned on both sides with rubber and is in the form of a tape 1⅝ inches wide. The insulation layers 19 and 20, respectively, are rubber having an average thickness of about 0.008 inch and are in the form of tapes 1½ inches wide. Each wire ply contains 99 ends of music quality steel wire of 0.012 inch diameter. Each wire ply is wrapped at a pitch of 1⅝ inches. The individual wires of the first wire ply 12 are wrapped in helices of $^{11}\!/_{16}$ inch outer diameter at an angle of about 53° to the hose axis. The wires of the second wire ply 13 are wrapped in helices of $^{47}\!/_{64}$ inch outer diameter at an angle of about 54° to the hose axis. The wires of the third wire ply 14 are wrapped in helices of $^{49}\!/_{64}$ inch outer diameter at an angle of about 56° to the hose axis. The wires of the fourth wire ply 15 are wrapped in helices of $^{51}\!/_{64}$ inch outer diameter at an angle of about 57° to the hose axis. The individual wires of each ply are formed with an inherent tendency to take the shape of a helix having the diameter of the neutral lay thereof equal to ⅝ inch and the pitch of the neutral lay thereof about 60% of the wrapped pitch. In the hose of this example each wire ply is in resilient gripping engagement with the underlying adjacent portions of the hose.

Another hose is made of identical construction as that of the preceding paragraph except that the wires of the first wire ply 12 are formed with an inherent tendency to take the shape of a helix having a neutral lay thereof of ⅞ inch diameter and a pitch of about 80% of the wrapped pitch. The first wire ply accordingly tends to expand relative to the underlying adjacent portions of the hose.

Another hose is of the construction described in the foregoing except that the wires of the first ply 12 are formed as noted in the preceding paragraph with a neutral lay of $^{11}\!/_{16}$ inch diameter and a pitch of about 1⅝″. In this construction the first ply is neutral. It neither grips nor expands.

A hose having two wire plies is made in accordance with the first example except that the two outer wire plies 14 and 15, and the insulation 19 and 20 are omitted, and the first two plies are wrapped at a slightly greater pitch so that the first ply wires are at an angle of about 54° and the second ply wires are at an angle of about 56° to the hose axis. Similarly hose having six or eight wire plies is made in accordance with the first example by adding the additional wire plies and insulation between them.

All the hose for which examples are given are suitable for fluid pressures as high as 15,000 pounds per square inch or more and have exceptionally better impulse fatigue life than hose of corresponding size with braided wire plies.

The angles at which the wires of the several plies are wrapped average about 55° which is close to the theoretical resultant angle at which the forces resulting from internal pressure tending to expand the hose diametrically and the forces tending to lengthen the hose are balanced. This results in a balanced hose construction. In some cases balance may be obtained by wrapping the wires of all plies at the same angle but including additional wires in successive plies, instead of using an equal number of wires per ply but varying the angle of the wires in successive plies as in the preceding examples.

The adhesion of the insulating layers to their adjoining wire plies may be somewhat improved by washing the wires and dipping them in a suitable adhesive to coat the wires in accordance with the usual techniques of bonding rubber to the metal before wrapping them on the hose carcass. Adequate adhesion is normally obtained, however, without such a preliminary treatment of the wire with this construction.

FIGS. 2 and 3 semi-schematically illustrate one form of apparatus used in manufacturing hose of this type. In these figures, only two wires A and B of a wire ply are shown for clarity. The equipment of FIGS. 2 and 3 is described and claimed in the patent of Willard Haas and Merle F. Fuller, U.S. 3,037,343, to which reference may be had for complete details about the apparatus. The following discussion summarizes the salient features of the apparatus and its mode of operation in making the hose construction of this application.

The equipment includes a mandrel 25 upon which the several wire plies and rubber and fabric materials forming the wall of the hose are assembled. The mandrel is movable axially by a truck 31 which includes a pinion 33 engaged with a horizontal track 32 to propel the truck. The mandrel is also rotated as it is axially advanced by a chuck 34 which is mounted on truck 31 to receive the front end of the mandrel. The chuck 34 is rotated by a motor 35 which also drives gear 33. Preferably the truck includes means (not shown) to vary the rotational speed of the chuck so that the pitch at which the wires are laid may be accurately regulated.

At the start of the operation of wrapping a ply, the truck 31 is initially positioned close to a wire-shaping mechanism 40 with the mandrel extending through the central opening of the mechanism 40. Each of the wires such as representative wires A and B are trained from their respective supply spools 42 and are threaded through the mechanism 40 and secured by tape or the like (not shown) to a portion of the hose carcass on the mandrel near the chuck 34. Then the truck 31 is driven rightward (as it is viewed in FIG. 2), with its chuck 34 rotating at the desired speed so that the several wires are pulled from their spools 42 and through the wire-shaping mechanism 40 and are wrapped in a helix against the hose carcass. Each supply spool 42 includes a let-off apparatus (not shown) for maintaining uniform tension in the wire as it is payed off the spool. A let-off apparatus for this purpose is more fully described in the patent of Ralph F. Cooper, U.S. Patent 2,920,840.

Between the spools and the shaping mechanism 40 the wires pass through a wire gathering plate 45. This plate includes a central opening 44 through which the mandrel is fed, and is supported in a vertical position behind the mechanism 40. It has a series of holes 46 with belled or rounded edges (see FIG. 2a) arranged in a circle, there being a hole for each wire, so that the wires are grouped in an array concentric with the hose carcass on the mandrel as they pass through this plate 45.

The shaping mechanism 40 includes a wire-spacing place 48 which is parallel to the gathering plate 45 and also has an opening 50 for the mandrel. This wire-spacing plate 48 has a series of holes 40 with belled or rounded edges (see FIG. 2b), arranged in a circle concentrically about its central opening 50. Each wire extends through its respective hole 49 and then over the upper surface of ring 52 which is positioned in front of spacing plate 48. The ring 52 is free to float or slide radially relative to the plate 48 and is supported entirely by the array of wires and is normally urged axially against the plate 48 by the tension in the wires. As shown in FIG. 2, the ring 52 is of toroidal shape and its size is such that its outer periphery does not exceed the diameter of the locus of centers of the holes 49 of plate 48. Thus the wires are fed through the holes 46 and 49 and are snubbed over the ring 52, without scraping over any sharp edges. For making ½ inch internal diameter hose as described in the preceding examples, the ring 52 is about ⅛ inch in cross sectional diameter and about 1¾ inches in diameter at its peripheral surface about which the wires are deflected.

The wires are snubbed over the outer peripheral surface of the ring 52 and then are converged through a central opening 54 of a die 55 supported in a movable guide plate 56 of the shaping mechanism 40. As shown, the mandrel also extends through the opening 54 of die 55. The guide plate 56 is supported in a guide way 57 and is in threaded engagement with a screw 58 which may be operated by a handle 59 to shift the guide plate 56 axially of the mandrel toward and away from the wire-spacing plate 48.

As the wires pass through the opening 54 in the die 55 they are wrapped upon the hose carcass on the mandrel in the region surrounded by the opening 54 at an angle to the axis of the mandrel proportional to the rotational and axial speed of the mandrel. The opening 54 closely surrounds the wrapped wires, there being preferably no more than about ¼₄ inch radial clearance between the outer diameter of the ply and the opening 54. At the mouth of opening 54, through which the wires are converged, there is a boss 60 having a convex wire-supporting surface 61 which blends smoothly into the internal cylindrical surface of opening 54. The wire-engaging surface 61 of boss 60 is of appreciably less curvature than the surface of ring 52 about which the wires are deflected. The wire-supporting surface of boss 60 may be formed on a radius equal to about the radius of opening 54. The deflection imparted to the wires on the surface 61 of boss 60 is generally oblique to the direction of the deflection imparted to the wires about the periphery of ring 52. As a result of deflecting the wires over these surfaces under appropriate tension, there is imparted to each wire an inherent tendency to take the shape of a helix of controlled size. By adjusting the axial distance between the guide plate 56 and the ring 52, the diameter and pitch of the neutral lay convolutions of the helix in which the wires are formed can be regulated. When the guide plate 56 is adjusted close to the ring 52, more of the surface of the ring 52 engages the wires, resulting in a more rigorous bending and deformation of the wires. A coil of smaller diameter is obtained when the guide plate 56 is positioned close to ring 52 than when the guide plate is moved away from the ring. Ordinarily a tension of 1 to 5 pounds is imposed on each wire by its respective let off.

In using equipment of the type shown in FIG. 2 to make the hose construction of FIG. 1, the tube 10 is first sleeved over the madrel and taped to its ends. Then one end of the mandrel is inserted through the central openings 44, 50 and 54 of the gathering plate 45 and the plates of the shaping mechanism, respectively, and into the chuck 34 of truck 31 while the truck is positioned at its most leftward position on rack 32 as shown in FIG. 2. The net fabric 17 in the form of a narrow tape is then threaded through the openings 44, 50 and 54 from its supply spool 65 and taped to the end of tube 10 near the chuck 34. Then the ends of all the wires forming the first reinforcing ply 12 are threaded individually from their respective spools 42 through the openings 46 in the gathering plate 45 where they are spaced apart in an array concentric with the mandrel. The wires are then threaded through their respective openings 49 in guide plate 48 and around the surface of the ring 52, and then the wires are converged through the central opening 54 of die 55. The ends of these wires are then attached, preferably by taping, to the tube 10 adjacent the chuck 34. The position of guide plate 56 is then adjusted toward ring 52 to establish the size of the inherent helical shape to be imparted to the wires.

When the motor 35 of the truck 31 is energized, the truck 31 proceeds with a uniform velocity rightward along the track 32 shown in FIG. 2. Simultaneously the chuck 34 is rotated to rotate the mandrel in a direction according to the direction of the helix desired for the wires of the first ply 12. The angular velocity of the mandrel will be adjusted relative to the linear speed of the mandrel so that the wires are wrapped at the desired angle to the longitudinal axis of the mandrel.

The rotation of the mandrel and the advance of the truck 31 orients the wires on the wire-supporting surfaces of the ring 52 and the boss 60 in a manner to impart an inherent helical shape of desired size. As the truck 31 advances rightward, all the wires of ply 12 are wound upon the net fabric 17 which is wound helically upon tube 10 simultaneously with the wrapping of the wires.

When the truck 31 has advanced a distance sufficient to bring the opposite end of the mandrel near the shaping mechanism 40, the truck is stopped and the wires are then taped securely to the mandrel near the right side of plate 56. After taping, the wires are cut off and the mandrel and truck 31 are repositioned as at the start of the first ply 12 for the application of the second wire ply 13. The foregoing procedure is then repeated to wrap the second ply 13 and each additional wire ply except that the direction of rotation of the mandrel is reversed for successive plies. The insulating materials between successive plies such as the reinforcing fabric sheath 18 and the gum insulating layers 19 and 20 are applied simultaneously with the laying of the wire ply which surrounds them, in the same manner in which the net fabric 17 is applied under the first wire ply 12. The guide plate 56 may be readjusted relative to the ring 52 for the application of each successive wire ply to shape the wires to the helical size desired. The die 55 is removably supported in guide plate 56. For wrapping each successive ply a different die 55 having an opening 54 of appropriate size for the outer diameter of the particular ply is positioned in the guide 56.

Variations in the hose construction and the method of making this hose may be made within the scope of the appended claims.

I claim:
1. A flexible hose comprising a tubular wall including rubber material and at least two mutually concentric plies each consisting of a multiplicity of individual resilient flexible helical-shaped wires;
    (A) all the wires of each ply:
        (1) being formed to impart to them an inherent tendency to take the shape of a helix, and
        (2) being disposed in their respective plies in parallel helical convolutions which extend at an angle to the longitudinal axis of the hose within the range from about fifty-one (51) degrees to about fifty-nine (59) degrees;
    (B) the helical convolutions in which the wires of the radially inner ply of said two plies are disposed being of opposite hand to the helical convolutions in which the wires of the radially outer ply are disposed;
    (C) all the wires of said radially inner ply being disposed in said ply in helical convolutions having a diameter and pitch which is not substantially greater than the diameter and pitch, respectively, of the helical convolutions which said wires have an inherent tendency to take; and
    (D) all the wires of said radially outer ply being disposed in said ply in helical convolutions the size of which differs from the size of the helical convolutions which said wires have an inherent tendency to take in a manner to maintain the wires of the outer ply under a stressed condition in which the wires exert gripping pressure on the underlying adjacent portions of said tubular wall.

2. A hose as defined in claim 1 wherein the diameter of said helical convolutions in which the wires of said radially outer ply are disposed in said ply is equal to or greater than the diameter of the helical convolutions which said wires have an inherent tendency to take; and the pitch of said helical convolutions in which the wires of said radially outer ply are disposed in said ply is greater than the pitch of the helical convolutions which said wires have an inherent tendency to take.

3. The method of making a flexible wire-reinforced hose which method comprises
(A) providing a tubular hose carcass of rubber material;
(B) progressively wrapping in concentric relation upon said hose carcass at least two plies of resiliently flexible wires in parallel helical convolutions,
  (1) the direction of the helix being of opposite hand in said plies, and
  (2) the wrapped convolutions of the wires of each ply extending at an angle to the longitudinal axis within the range from about fifty-one (51) degrees to about fifty-nine (59) degrees;
(C) progressively bending all the wires of the radially inner ply while said wires are being wrapped to impart to them an inherent tendency to take the shape of a helix having a diameter and pitch not substantially exceeding the diameter and pitch of the convolutions in which said wires are in fact wrapped; and
(D) progressively bending all the wires of the radially outer ply while the wires are being wrapped to impart to them an inherent tendency to take the shape of a helix the size of the convolutions of which differs from the size of the convolutions in which said wires are wrapped in a manner to maintain the wires of the outer ply under a stressed condition in which the wires exert gripping pressure on the underlying adjacent portions of said tubular wall.

References Cited by the Examiner

UNITED STATES PATENTS

| | | | |
|---|---|---|---|
| 1,914,455 | 6/33 | Pahl | 138—132 X |
| 1,972,290 | 9/34 | Conner | 153—64 XR |
| 2,128,814 | 8/38 | Gish | 138—133 X |
| 2,156,899 | 5/39 | Pierce | 138—134 X |
| 2,825,364 | 3/58 | Cullen et al. | 138—130 X |
| 3,037,343 | 6/62 | Hass et al. | 57—9 |

FOREIGN PATENTS 833,492   7/38   France.

LAVERNE D. GEIGER, *Primary Examiner.*
LEWIS J. LENNY, *Examiner.*